June 11, 1957 H. B. BROOKS 2,795,708

QUARTZ CRYSTAL HAVING A LOW LEVEL OF SPURIOUS RESPONSE

Filed Feb. 23, 1954

INVENTOR.
HERBERT B. BROOKS,
BY Nicholas T. Volk
HIS ATTORNEY 2,795,708

QUARTZ CRYSTAL HAVING A LOW LEVEL OF SPURIOUS RESPONSE

Herbert Berwick Brooks, Tucson, Ariz., assignor to Hughes Aircraft Company, Culver City, Calif., a corporation of Delaware Application February 23, 1954, Serial No. 411,629

3 Claims. (Cl. 310—9.5)

This invention relates to quartz crystal oscillator plates and in particular to a quartz plate cut from mother quartz with an orientation with respect to the crystallographic axes of the mother quartz such that spurious responses to shock excitation are minimized.

Quartz crystal oscillator plates are employed in several ways. They may be employed as control elements of self excited continuous wave oscillators, as resonators driven by an electric oscillation from some source, or as shock excited oscillators. In any of these uses it is desirable that only one frequency of operation shall prevail and that there shall be a minimum of spurious responses. This last requirement is most important in the resonator and shock excited crystal applications.

The presence of spurious responses reduces the control efficiency of resonator and oscillator crystals and can, if too great, give erroneous results at the desired frequency and in some circuit applications indicate operation at unwanted frequencies.

Spurious modes of vibration at other than the thickness vibration frequency of such quartz oscillator plates cause both frequency and amplitude modulation of an exponentially damped sine wave.

Accordingly it is an object of this invention to provide a quartz crystal oscillator plate in which spurious responses are a minimum when the crystal is used in shock excited circuit applications.

It is another object of this invention to provide a quartz crystal with an orientation of its faces having an angle with respect to the crystallographic "Z" axis of +27° rotating on the crystallographic "X" axis.

It is a further object of this invention to provide a quartz oscillator plate wherein spurious responses have been reduced below 10% of the primary response.

These and other objects of this invention will be clearly understood from the claims and description below, taken together with the drawings made of part of this specification.

Figure 1:
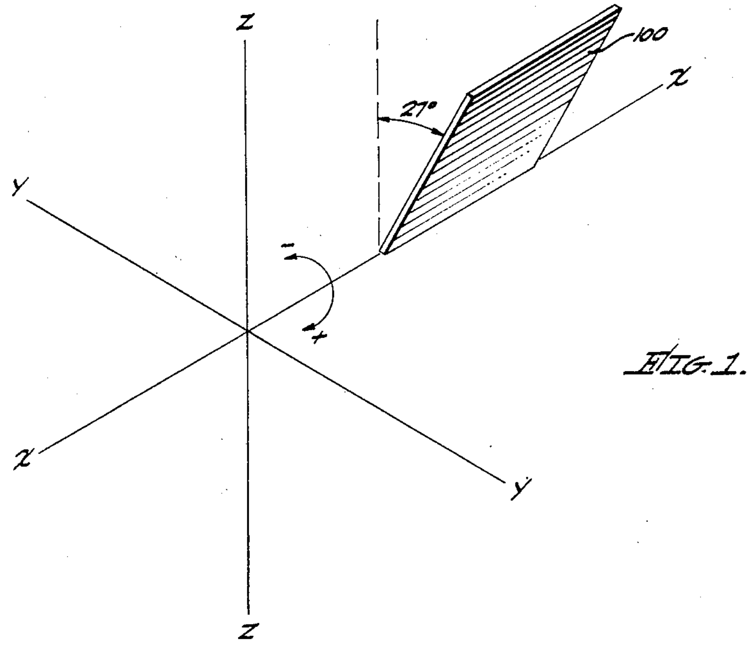
Figure 2:
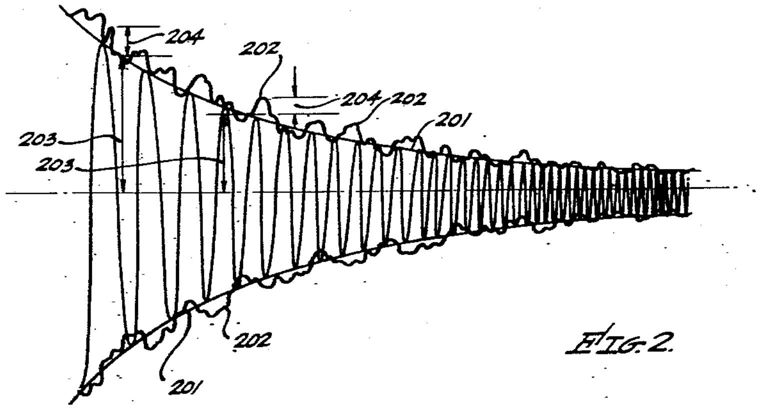

In the drawings: Fig. 1 shows diagrammatically the orientation of the quartz crystal plate of this invention with respect to the trigonal crystallographic axis of a mother quartz crystal from which it is cut, and Fig. 2 is a diagram of the waveform of a damped wave developed by the crystal of this invention in a shock excited oscillating circuit to show the relationships of the effects of spurious responses to the desired response.

Referring now to Fig. 1, Z—Z is a line representing direction of the vertical, optic, or "Z" axis of a quartz crystal. The line X—X is representative of the electrical of "X" axis and is in a plane at right angles to the axis Z—Z. The line Y—Y is represenative of the mechanical or "Y" axis of the quartz crystal and is perpendicular to the "X" axis in the same plane. The crystal 100 is shown in relation to these axes as it may be cut from a right handed quartz crystal with relation to the trigonal axes of the crystal.

The natural growth of crystals is sometimes left-handed, and sometimes right-handed. This handedness refers to the orientation of certain of the crystallographic planes within the mother crystal and is a factor well known to crystallographers and those engaged in the cutting of quartz crystal oscillator plates.

It may be seen in Fig. 1 that in the preferred embodiment that the angle at which the crystal is cut is 27° from the "Z" axis in the positive direction rotating on the "X" axis. The positive direction for right-handed quartz is clockwise. The positive direction for left-handed quartz is counterclockwise. Therefore, the crystallographic cut of the crystal 100 is at an angle of +27° from the $z$-axis.

An example of the application of the crystal is given below for two megacycle operation. A representative set of crystal edge dimensions for two megacycle operation is 0.907×0.986×0.033 inch, with the long dimension (0.986 inch) along the $x$-axis. The thickness, .033 inch, determines the frequency of the crystal. The mechanical resonant frequency of a quartz crystal plate is determined by its thickness when operated in the shear modes of vibration. In the example given above the thickness constant (K) of frequency would be 65. This is obtained from the formula that $$\text{thickness, } t \text{ (in inches)} = \frac{K}{\text{frequency (in kilocycles)}}$$

Thus $$.033'' = \frac{65}{2000 \text{ kc.}}$$

The angle of +27°, rotating on the $x$-axis, from the $z$-axis, was selected because it was discovered that at this angle the crystal produced a damped sine wave with a minimum of spurious oscillation or spurious excitation response frequencies.

The angle in the neighborhood of 27° does not coincide with zero excitation of any mode of vibration as discussed by Mason in his U. S. Patent No. 2,173,589. According to the present invention it has been discovered that an angle of between 25° and 29° gives the lowest spurious vibration response between 0° and +38° from the $z$-axis, rotating on the $x$-axis. It is believed that at the +27° angle two opposing spurious modes of vibration are excited by the pulse, and that their amplitudes become approximately equal near +27° cancelling their output. This hypothesis is supported by the fact that the degree of modulation of the damped sine wave of the crystal output when shock excited is quite sensitive to such defects in manufacture of the crystals as slight chips in parts of the crystal surfaces, curvature or departure from orthogonality of the surfaces, or electrode defects. An example of the electrodes used with the crystals employed in this invention is flat stainless steel electrodes clamped on the crystal surfaces under a spring pressure of about two pounds. Centerclamping of electrodes has yielded improved results in some applications of these crystals.

The relationship existing between interfering modes of vibration of quartz crystal oscillator plates and the phase or amplitude modulation of the exponential damped oscillation of the crystal when excited by a pulse may be observed by displaying the wave on a slow-sweep oscilloscope; by this means the quality of oscillator plates used in this invention are judged.

There is shown in Fig. 2 a typical envelope of the waveform of a damped oscillation developed by a two megacycle crystal cut in accordance with this invention. The smooth line 201 encloses the ideal envelope of such a damped oscillation. Such an ideal envelope is approximated very closely or even exactly with the crystal plate of this invention. The jagged outline 202 on said ideal envelope represents an extreme case of the result of combined frequency and amplitude modulation of the damped train of oscillations by crystal of the prior art. Arrow 203 from the center of the wave envelope to the outside represents the amplitude of the ideal wave. Arrow 204 represents the amplitude of the "modulation" of the envelope.

The degree of the spurious responses present is determined by the ratio of the amplitude of the modulation represented by arrow 204 to the ideal amplitude represented by arrow 203 at any part of the damped wave envelope.

In a copending application Serial No. 411,630, filed February 23, 1954, entitled, "Crystal Controlled Marker Pulse Generator" by the present inventor, there is described a circuit employed in the application of a crystal of the type described hereinabove.

It has been determined that the +27° cut of this invention as hereinbefore described provides crystals with which it has been possible to obtain operation of the crystal in circuits for producing damped oscillation trains (such as shown in Fig. 2) which have a ratio of modulation (arrow 204) to envelope amplitude (arrow 203) of less than 10%.

What is claimed is:

1. A quartz crystal oscillator plate for shock excitation, having a spurious to major frequency response ratio of approximately 1 to 10, said plate being cut from the mother quartz at an angle of +27° from the "Z" axis, the axis of rotation being the X-axis.

2. A quartz crystal oscillator plate as defined in claim 1 for use in shock excited oscillator circuits, said crystal plate being dimensioned for an operating frequency of two megacycles with a thickness of .033 inch an X-dimension of 0.986 inch and Z-dimension of 0.907 inch.

3. A quartz crystal oscillator plate having a minimal spurious frequency response for pulsed operation at a frequency of approximately two megacycles, said crystal plate being so oriented with respect to the crystallographic axes of quartz that the longitudinal axis of said quartz plate is parallel with the crystallographic $x$-axis and the transverse axis of said plate is rotated about said $x$-axis +27° from the crystallographic Z-axis, the dimension along said longitudinal axis being longer than the dimension along said transverse axis; said oscillator plate having a thickness frequency constant, K, of 65, represented by the formula:

$$\text{thickness in inches} = \frac{K}{\text{frequency in kilocycles}}$$

References Cited in the file of this patent

UNITED STATES PATENTS 2,157,808 Wolfskill ---------------- May 9, 1939